OR 3,625,600 SEARCH ROOM

[11] 3,625,600

[72] Inventor Stephen Henry Rowe
Los Gatos, Calif.
[21] Appl. No. 24,263
[22] Filed Mar. 31, 1970
[45] Patented Dec. 7, 1971
[73] Assignee International Business Machines Corporation
Armonk, N.Y.

[54] ACOUSTIC LIGHT DEFLECTION METHOD
9 Claims, 5 Drawing Figs.

[52] U.S. Cl. .......... 350/161
[51] Int. Cl. .......... G02f 1/16
[50] Field of Search .......... 350/160, 161, 162; 250/199

[56] References Cited
UNITED STATES PATENTS
3,488,438 1/1970 Korpel .......... 350/161
3,462,603 8/1969 Gordon .......... 350/161

*Primary Examiner*—William L. Sikes
*Attorneys*—Hanifin and Jancin and Melvyn D. Silver

ABSTRACT: An acousto-optical deflection method employing control of the wave front relationship between the acoustic waves generated in an acoustical Bragg deflector and the optical wave fronts emanating from any one of a number of light sources located along an axis normal to the generated acoustic wave fronts, so that a light beam generated by any one of a number of light sources may be deflected to any one of a desired number of positions without the necessity of adjusting each individual light source position, and without physically moving either the light sources or the acoustical deflector. The system includes in sequence at least one light source, a collimating lens, an acoustical Bragg deflector, and an imaging lens. Applications to data tracking are included.

PATENTED DEC 7 1971 3,625,600

*INVENTOR.*
STEPHEN H. ROWE

*BY* Melvyn D. Silver
AGENT

ACOUSTIC LIGHT DEFLECTION METHOD

FIELD OF THE INVENTION

Light deflection methods in general and, in particular, light deflection methods utilizing Bragg acousto-optical deflection cells as the deflecting medium.

BACKGROUND

Prior Art

The theory behind acoustic light deflection methods is well known in the art, as to require no detailed explanation here. Such art includes "A Review of Acousto-Optical Deflection and Modulation Devices," by E. I. Gordon, *Applied Optics*, Vol. 5 , No. 10, Oct. 1966, page 1629 and "A Television Display Using Acoustic Deflection and Modulation of Coherent Light," by A. Korpel, et al., page 1677 of the above referenced journal.

Prior art deflection systems generally include a light source, a collimating lens, an acoustic Bragg deflector, commonly referred to as the deflection cell, and an imaging lens. Usually the light source is fixed at a given position in relation to the position of the acoustic cell, or the position of the wave fronts generated in the acoustic cell, to provide various deflection points for the given light source as a function of the frequency induced in the acoustic cell. These points may be imaged upon a data track, an imaging screen, or any other suitable means. Because of the conditions generally imposed in the prior art, a minimal variation from a fixed position of the light source was possible before the Bragg condition would be lost and deflection would not occur. Typically then, each light source required its own deflection system if it were desired to have a multitude of light sources to provide a greater multitude of deflection positions than available with a single light source. The overall cost, of course, increases with additional systems added. Further, the physical space occupied by such a multitude of systems often prohibits its use where space limitations are important.

Nonetheless, acoustic Bragg deflection systems are attractive for many purposes, including data tracking, and lend themselves to the single frequency output of lasers as the light source. Such acoustic deflection cells may either be liquid or solid state devices, the solid state devices generally offering a higher frequency range of operation.

The prior art, then, offers a laser deflection device that is attractive in its operating capabilities, but unattractive from the limited number of deflection positions available and the multitude of deflection systems necessary to achieve a workable number of deflection positions when a number of discrete light sources are employed.

OBJECTS OF THE INVENTION

Thus, it is an object of this invention to utilize acoustic Bragg deflection techniques, to allow deflection of a multitude of light beams emanating from a multitude of light sources from a single Bragg deflection cell.

Further, another object is to allow such deflection to occur without the necessity of physically moving either the light sources or the acoustic cell for each particular combination utilized.

Another object is to utilize such a deflection system in a data tracking system for read/write purposes, or for a general light tracking system, or where Kerr readout is desired, such as in a magneto-optic memory system.

SUMMARY OF THE INVENTION

These and other objects are met by the method of this invention.

This invention relates to an acousto-optic Bragg deflection method, whereby by defining an arbitrary X-axis, Y-axis, and optic axis normal to each other, and locating in succession along such optic axis at least one light source for generating a light beam directed generally along the optic axis, toward a collimating means for collimating the beam, an acoustic Bragg cell for deflecting the beam, and an imaging means for imaging the beam, any of a number of light sources located along the Y-axis may be deflected to any number of desired deflection positions. In more detail, the light sources are located along the Y-axis so as to generate after collimation a wave front varying from parallel to the $x$–$y$ plane when the light source is located at the optic axis to a wave front having an angle $\Phi$ with the $x$–$y$ plane when located off the optic axis and along the Y-axis at a given point P, where $\Phi$ equals the distance offset from the optic axis divided by the focal length of the collimating lens; while generating in the acoustic deflection cell acoustic waves traveling in the direction making an angle $\alpha$ with the X-axis, with the acoustic wave fronts making an angle $\alpha$ with the $y$-$z$ plane, and parallel to the Y-axis, to create an angle $\theta$ between the optical and acoustic wave fronts defined by $\cos\theta = \sin\alpha \cdot \cos\Phi$, resulting in the effective Bragg angle $\beta$ between the acoustic wave fronts and the principal ray of the light beam originating from P being $$\left(\frac{\pi}{2} - \theta\right)$$

so that $\sin\beta = \sin\alpha \cdot \cos\Phi$, with the change $\Delta\beta$ due to a maximum change $\Phi$ given by $$\Delta\beta = \alpha\,\frac{(\phi)^2}{2}$$

Thus, various collimated beams originating from light sources located at different points along the Y-axis, and making different angles $\Phi$ with the optic axis, may be made to simultaneously fulfill the Bragg angle conditions with respect to the acoustic wave fronts, and be deflected to any one of a predetermined number of deflection positions perpendicular to the Y-axis.

The deflected beams may be utilized in data tracking methods, so long as certain angular relationships are maintained.

These and other embodiments of the invention will best be understood in light of the specification and drawings that follow. IN THE DRAWINGS FIG. 1 is a schematic of the overall deflection system of this invention.

FIG. 2 shows the relationship between the optical wave fronts and the acoustic wave fronts along the $x$, $y$, and $z$ planes as defined in FIG. 1.

FIG. 3 further defines the relationship between the optical wave fronts from a given light position P in FIG. 1, and the $x$, $y$, $z$ planes and acoustic wave fronts.

GENERAL DESCRIPTION

Figure 1:
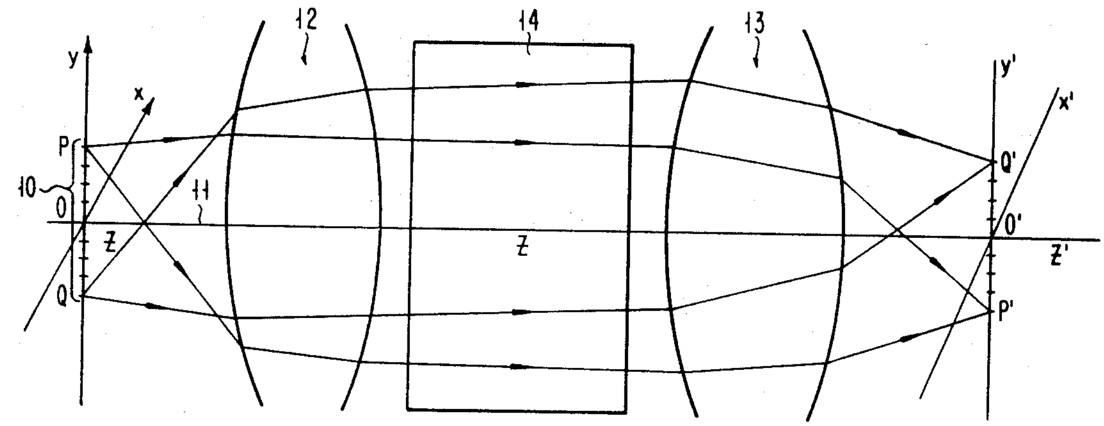

In many light deflection systems, it is desirable to have a multitude of lasers divided into subarrays, to provide a multitude of deflection positions which, with proper imaging optics and deflectors, can be utilized for tracking purposes in, for example, memory systems. For example, it may be assumed that 3,200 concentric equispaced tracks may be desired to be obtained from 400 light sources, particularly 400 solid state lasers, each of which would then necessarily have to be deflected to eight individual positions. The 400 lasers would then be divided into linear subarrays, with each array having separate imaging optics and deflectors. Assume, for example, it is desired to have 40 equispaced lasers, such as gallium arsenide lasers, in a subarray, which might occupy a total length of 0.32 cm. In FIG. 1, the laser subarray lies along the axis indicated as the Y-axis. In FIG. 1 is also shown the X-axis and the optic axis or Z-axis, each axis normal to the other.

Figure 2:
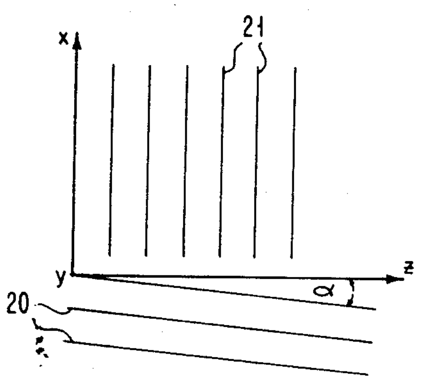

A laser subarray 10 is located centrally with respect to the optic axis 11, equidistantly from the points marked OP to the points marked OQ. Laser subarrays thus lie along the Y-axis perpendicular to the $z$ direction, which $z$ direction coincident coincident with the optic axis 11 of the optical system. Light from the lasers 10 is made parallel by the collimator 12 and proceeds to an imaging lens 13 to form an image indicated as P′O′Q′ in the $x'-y'$ plane. In the space between the collimator 12 and imaging lens 13 is situated an acoustic deflector 14. The transducer generated acoustic waves travel in a direction which makes a small angle $\alpha$ with the X-axis, as indicated in FIG. 2, and the acoustic wave fronts 20 make an angle $\alpha$ with the $y-z$ plane. The optical wave fronts are indicated at 21.

Figure 3:
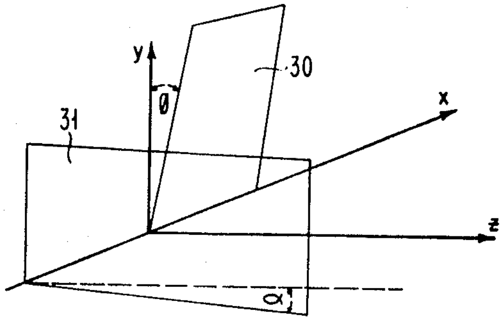

In the image plane $y'-x'$, the spots may be deflected to various positions in the $x'$ direction. For the system under consideration, only eight output positions are required for each laser image; this is a relatively modest requirement for acoustic deflectors. As shown in FIG. 3, then, the optical wave front 30 from the axial laser will be parallel to the $y-x$ plane in the space between the collimator and imaging lens, but wave fronts originating from off-axis lasers will be tilted with respect to this plane. Letting the most off-axis laser be at P (FIG. 1) and letting its wave front make an angle $\Phi$ with the $x-y$ plane, where $\Phi$ may be defined as the distance OP divided by the focal length of the collimating means, then the angle $\theta$ between the optical wave front 30 and the acoustic wave fronts 31 is given by $\cos\theta=\sin\alpha\cdot\cos\Phi$.

The effective Bragg angle $\beta$ between the acoustic wave fronts and the principle ray of the light beam originating from P is $$\left(\frac{\pi}{2}-\theta\right)$$

so that $\sin\beta=\sin\alpha\cdot\cos\Phi$.

Neglecting terms of higher order than the second, the second equation shows that the change $\Delta\beta$ due to a maximum change $\Phi$ is given by $$\Delta\beta=\alpha\,\frac{(\phi)^2}{2}\,.$$

For an acoustical deflector, $\alpha$ is typically 1/100 of a radian, and with a collimator of focal length 16 mm., $\Phi=1/10$ radian, so that $\Delta\beta=5\times10^{-5}$ radians. This variation in Bragg angle is two orders of magnitude less than the tolerable angular bandwidth of those acoustic deflectors employing, for example, alpha-iodic acid as the acoustico-optical medium. The use of alpha-iodic acid is discussed in such publications as "Alpha-Iodic Acid: A Solution Grown Crystal With A High Figure of Merit for Acousto-Optic Device Applications," D. A. Pinnow and R. W. Dixon, *Applied Physics Letters*, 13, 156, 1968.

Thus, the various collimated beams coming from different lasers, while making different angles with the Z-axis, may be made to simultaneously fulfill the Bragg angle condition with respect to the acoustic wave fronts. The actual positions available depend, as mentioned before, on the focal length of the collimator, realizing also that $\theta$ equals the wavelength of the light $\lambda$ divided by twice the wavelength of the sound $\Lambda$, equals $\lambda\cdot f$, the frequency of the waves in the cell, over twice $v$, the velocity of sound. Gordon (reference above) has shown, by considering momentum conservation concepts, that Bragg scattering can be obtained over a variation in Bragg angle, $\Delta\beta$, equal to the wavelength of sound $\Lambda$ divided by the acoustic sound column length W. Thus, with any of the available parameters fixed, which parameters are thus a matter of choice, such as the collimator focal length, the laser wavelength, the sound wavelength and the acoustic column length, the tolerance limits of the system may be calculated, such as the maximum acceptable $\Phi$ angular relationship, for defining the light source positions relative to a given collimating lens, for example.

Figures 4, 5:
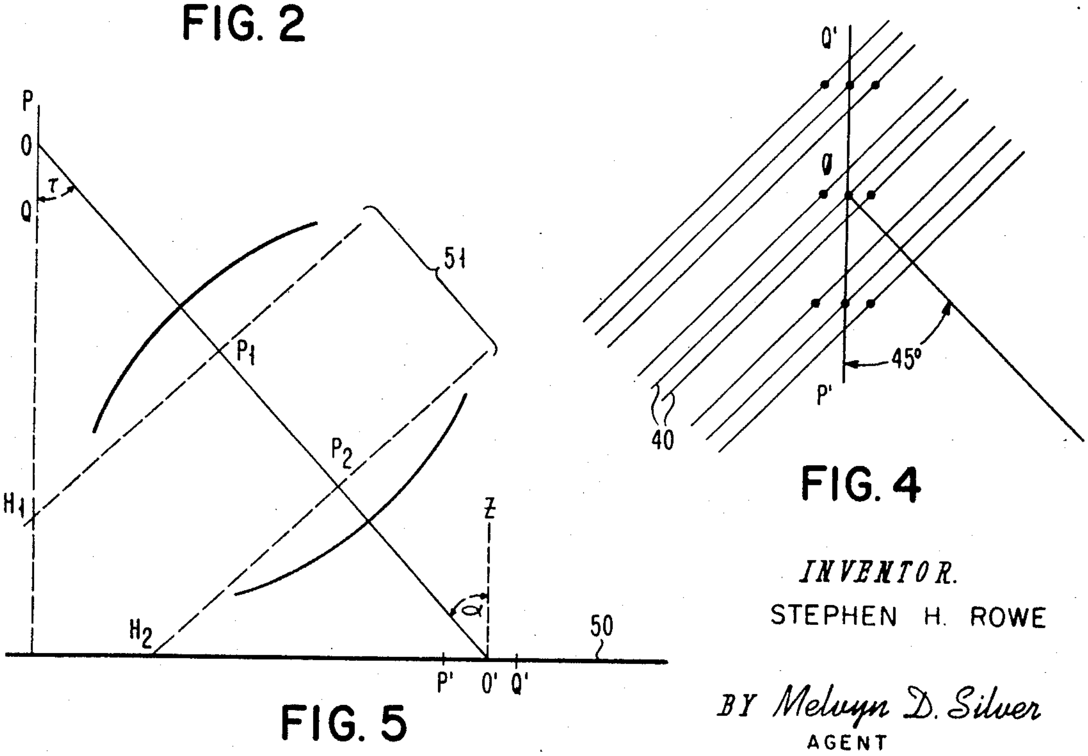
FIG. 4 is a schematic showing a tracking relationship obtainable utilizing the deflection method of this system.
FIG. 5 shows a Kerr magneto-optic readout system utilizable with the deflection method of this invention

The ensemble of output spots is shown in FIG. 4. The spots are initially along the line P′O′Q′ when the acoustic deflector is operating at a certain mean frequency $f_0$. Suitable changes in frequency above or below $f_0$ result in the spots being deflected along lines perpendicular to P′O′Q′, as shown by the spots indicated to the right and left of the line indicated P′O′Q′. If the line P′O′Q′ is arranged to be at 45° to the radius vector of, for example, a moving memory disk, the formation of a multitude of paths 40 is achieved from the schematic shown in FIG. 4. Of course, while only three deflection positions are shown in FIG. 4, any desired number of positions is available, being solely a function of the resolving power or resolution of the individual spots, the bandwidth of the deflector and the number of light sources available.

It is important to note at this time that the acoustic waves propagate in a direction along $x$, which is perpendicular to the length of the laser array. In this way, the variation in $\beta$ is reduced to a minimum. The largest variation in $\beta$ will occur when the direction of sound propagation is parallel to the laser array. Deflection of spots then occurs along P′O′Q′. However, because of the wide variation in $\beta$, C1/5 radian), only a few beams emanating from lasers near the axis would meet the Bragg condition, thus ruling out the possibility of using Bragg deflection for the entire array.

FIG. 5 shows the layout of a writing optical system utilizing the Kerr magneto-optic effect. The laser array is indicated as POQ, with the collimator, deflector and imaging lens, as shown in FIG. 1, represented generally in the area designated as 51.

The axis $z$ of the optical system makes the appropriate Kerr angle $\alpha$ with the normal to a moving disk 50, assuming a magneto-optic disk material, with such material being well-known in the art. Since the direction of $z$ is now normal to the disk, the image array must be tilted at an angle $\tau$ to the $z$ axis to enable the image P′O′Q′ to be uniformly in focus on the disk. The magnitude of $\tau$ is such that the intercepts of the two principal planes $P_1\,H_1\,P_2\,H_2$ found by producing POQ and Q′O′P′ must be equal. This procedure leads to the well known "keystone effect" where the magnification over P′O′Q′ increases with distance from the lens. In this case, assuming an angle $\tau$ of 15° and unit magnification for the spot O′, the maximum departure from unit magnification would be no more than 5 percent. As explained above, with the acoustic deflector in operation, the various deflected images form a rectangular matrix in the disk plane, while fulfilling the Kerr condition.

Thus, by arranging for the propagation action of the ultrasound waves to be perpendicular to the length of the laser array, all the beams from the lasers can be efficiently Bragg deflected and, furthermore, the subsequent rectangular matrix of focused spots may be used in a disk memory device provided that the sides of this rectangle are arranged to be at an angle, such as at 45° to the radius vector of the disk, as in the FIG. 4 application, or for a Kerr effect system as shown in FIG. 5.

While two specific applications have been given above for the acoustic deflection technique described in the first part of the general description, other applications will be evident to those skilled in the art.

What is claimed is:

1. In the method of deflecting a light beam by acoustic Bragg deflection in an optical system having an arbitrarily defined X-axis, Y-axis and optic axis normal to each other, and, located in succession, at least one light source for generating a light beam directed generally parallel to said optic axis through a collimating lens for collimating said beam to an acoustic Bragg cell for deflecting said beam to an imaging lens for imaging said deflected beam, said light source being located along said Y-axis so as to generate a light beam which after collimation has a wave front varying from parallel to the x-y plane when said light source is located at said optic axis to a wave front having an angle $\Phi$ with the $x-y$ plane when located off the optic axis and along the Y-axis at a point P, where $\Phi$ equals the distance said light source is offset from the optic axis divided by the focal length of said collimating lens, the improvement comprising:

Generating in said acoustic deflection cell acoustic waves traveling in a direction making an angle $\alpha$, with the X-axis, with the acoustic wave fronts making an angle $\alpha$with the $y$–$z$ plane, and parallel to the Y-axis to create an angle $\theta$ between the optical and acoustic wave fronts defined by $\cos\theta = \sin\alpha\cdot^{\cos}\Phi\cdot$ whereby the effective Bragg angle $\beta$ between the acoustic wave front and the principal ray of the light beam originating from P being $$\left(\frac{\pi}{2}-\theta\right)$$

is such that $\sin\beta = \sin\alpha\cdot\cos\beta$, with the change $\Delta\beta$ due to a maximum change $\Phi$ given by $$\Delta\beta = \alpha\,\frac{(\phi)^2}{2},$$

so that various collimated beams originating from light sources located at different points along the Y-axis making different angles $\Phi$ with the optic axis, simultaneously fulfill the Bragg-angle conditions with respect to the acoustic wave fronts and may be deflected to any one of a predetermined number of deflection positions perpendicular to the Y-axis as a function of the acoustic frequency of the Bragg cell.

2. The method of claim 1 including the step of locating along said Y-axis a plurality of light sources within the maximum acceptable $\Phi$ angular relationship.

3. The method of claim 1 including the step of varying the focal length of said collimating means to vary the maximum acceptable $\Phi$ angular relstionship.

4. A method of focusing and deflecting light to allow track formation upon the surface of a moving object, comprising the steps of:

defining an X-axis, Y-axis and optic axis normal to each other, locating in succession along said optic axis at least one light source for generating a light beam directed generally along said optic axis to a collimating lens for collimating said beam to an acoustic Bragg cell for deflecting said base to an imaging means for imaging said deflected beam, said light source being located along said Y-axis so as to generate a light beam which after collimation has a wave front varying from parallel to the $x$–$y$ plane when said light source is located at said optic axis to a wave front having an angle $\Phi$ with the $x$–$y$ plane when located off the optic axis and along the Y-axis at a point P, where $\Phi$ equals the distance said light source is offset from the optic axis divided by the focal length of said collimating means, generating in said acoustic deflection cell acoustic waves traveling in a direction making an angle $\alpha$ with the X-axis, with the acoustic wave fronts making an angle $\alpha$ with the $y$–$z$ plane, and parallel to the Y-axis to create an angle $\theta$ between the optical and acoustic wave fronts defined by $\cos\theta = \sin\alpha\cdot\Phi$, and locating said surface of said moving object in an angular, non-normal relationship to the Y-axis upon which said light sources are located, whereby a plurality of light tracks separate from each other are generated upon said surface of said moving object as a function of deflection positions of each of said light sources.

5. The method of claim 4 including the step of aligning said surface and said light sources at 45° relative to each other, whereby equally spaced tracks are generated upon said rotating surface.

6. The method of claim 4 including the step of locating along said Y-axis a plurality of light sources within the maximum acceptable $\Phi$ angular relationship.

7. The method of claim 4 wherein the surface of said moving object is a light-responsive material.

8. The method of claim 4 wherein said surface comprises a magneto-optic material.

9. The method of claim 4 including the step of aligning said light sources and said surface of said moving object relative to each other to maintain the Kerr mangeto-optic angular relationship.

* * * * *